United States Patent [19]

Rolle

[11] Patent Number: 5,223,439
[45] Date of Patent: Jun. 29, 1993

[54] RADON DAUGHTER DOSEMETER

[75] Inventor: Rainer Rolle, Johannesburg, South Africa

[73] Assignee: Atomic Energy Corporation of South Africa Limited, South Africa

[21] Appl. No.: 966,469

[22] Filed: Oct. 26, 1992

[30] Foreign Application Priority Data

Oct. 29, 1991 [ZA] South Africa ............. 91/8601

[51] Int. Cl.$^5$ ............................................. G01N 1/22
[52] U.S. Cl. ........................................ 436/177; 55/66;
55/97; 55/270; 55/337; 55/459.1; 73/28.04;
73/28.05; 436/178; 436/902
[58] Field of Search ............... 55/1, 68, 97, 337, 459.1,
55/270; 73/28.04, 28.05, 23.2; 436/177, 178,
902

[56] References Cited

U.S. PATENT DOCUMENTS

| | | | |
|---|---|---|---|
| 3,505,523 | 8/1968 | Becker | 250/83 |
| 3,569,697 | 3/1971 | McCurdy | 250/43.5 |
| 3,665,194 | 5/1972 | Alter et al. | 250/83 CD |
| 3,949,594 | 4/1976 | Treaftis et al. | 55/270 X |
| 4,055,762 | 10/1977 | Durkin | 250/253 |
| 4,178,794 | 12/1979 | Iugle et al. | 55/270 X |
| 4,274,846 | 6/1981 | Smith | 55/270 |
| 4,342,913 | 8/1982 | Shepherd | 250/364 |
| 4,607,165 | 8/1986 | Burghoffer et al. | 250/435 |
| 4,808,827 | 2/1989 | Woollam | 250/370.02 |
| 4,847,503 | 7/1989 | Tetley et al. | 250/435 |
| 4,861,985 | 9/1989 | Pai | 250/253 |
| 4,864,143 | 9/1989 | Pai | 250/472.1 |
| 4,941,899 | 7/1990 | Liu | 55/270 |
| 4,948,970 | 8/1990 | Port et al. | 250/253 |
| 5,106,759 | 4/1992 | Addison | 436/178 |

Primary Examiner—Charles Hart
Attorney, Agent, or Firm—Woodard, Emhardt, Naughton, Moriarty & McNett

[57] ABSTRACT

The invention provides a radon daughter dosemeter made up of a cyclone, a filter in a filter holder and a radiation detector spaced from the filter. The filter is arranged to filter dust and aerosol particles from air issuing from the air outlet of the cyclone, and the detector is arranged to detect radiation from dust and aerosol particles on the filter. The invention also provides a method of monitoring radiation exposure of persons; and an electrochemical etching cell for the etching of detectors used in the dosemeter.

10 Claims, 2 Drawing Sheets

RADON DAUGHTER DOSEMETER

This invention relates to a radon daughter dosemeter. More particularly it relates to a radon daughter dosemeter suitable for personal use; to a method of monitoring the degree of exposure to which a person is exposed by radiation from radon daughters; and to an etching cell for use with the dosemeter.

According to one aspect of the invention, there is provided a radon daughter dosemeter which comprises:

a cyclone having an air inlet, a solids outlet and an air outlet, for separating non-respirable dust and aerosol particles from air;

a filter mounted on the cyclone for filtering respirable dust and aerosol particles from air passing through the cyclone from the air inlet to the air outlet; and a detector mounted on the cyclone for detecting radiation emitted by radon daughters attached to dust and aerosol particles on the filter.

Preferably the dosemeter is of portable construction, and comprises a portable electrochemical cell-driven air suction pump connected to the air outlet of the cyclone, for suction of air through the cyclone.

The detector may be a solid state nuclear track etch detector for detecting $\alpha$-particle radiation. Thus, the detector may comprise a suitable plastics material, such as a suitable polycarbonate, capable of being penetrated by $\alpha$-particles having sufficient kinetic energy, to leave tracks, which detector can be etched to render the tracks detectable and countable.

The filters in said personal dust samplers are typically flat circular discs, and the detector may accordingly be flat and spaced from the filter in more or less parallel opposed relationship. Thus, the filter and detector may be flat and planar in shape, spaced from each other in parallel opposed relationship. In particular, the air outlet of the cyclone may have a hollow circular-cylindrical filter holder releasably attached thereto, the filter being a circular disc and being located as a partition in the filter holder between an inlet to the filter holder which communicates with the cyclone air outlet, and an air outlet from the filter holder, which outlet may be releasably connected or connectable to the pump. In this case the detector may be similarly circular in outline, being arranged as a partition in the holder, upstream with regard to air flow, from the filter, the detector having an air flow opening therethrough, e.g. centrally positioned, so that the detector is an annular disc.

A radiation-absorbing or discriminator may be located between the filter and detector for reducing the number of tracks detected by the detector, e.g. over a convenient metering period, to a value which can be counted readily.

Solid short-lived daughters of radon ($^{222}$Rn) include $^{218}$Po, $^{214}$Pb and $^{214}$Po which are solid and can become attached to respirable dust or aerosols. Of these, $^{218}$Po can decay to emit one 6MeV $\alpha$-particle; and $^{214}$Po can decay to emit one 7,8MeV $\alpha$-particle. The Applicant has found that an absorber or discriminator which shields the detector from 6MeV $\alpha$-particles from the decay of $^{218}$Po reduces the number of tracks to a suitable value for counting. Furthermore, the Applicant has found that a count of the tracks caused by 7,8MeV $\alpha$-particles gives an acceptably accurate measure of the level of exposure to $\alpha$-particle radiation from airborne radon daughters, to which persons in the environment in which a sampling takes place are subjected, the error being at most about 30%, regardless of the ratios of $^{218}$Po:$^{214}$Pb:$^{214}$Po in the air being sampled, in terms of potential $\alpha$-energy concentration.

The absorber or discriminator may similarly be a suitable plastics disc, e.g. of polycarbonate such as 'MYLAR', which may also be annular. For a spacing of 10 mm between the filter and detector, a mylar foil disc of 36 $\mu$m thickness at or adjacent the detector has been found to be suitable to shield the detector from 6MeV radiation from radon daughters on the filter but, naturally, routine experimentation should be employed to determine absorber- or discriminator thicknesses suitable for other spacings, depending on what minimum energy of $\alpha$-particles it is desired to count.

When a predetermined volume of air has passed through the dosemeter, the detector will be removed and suitably etched, e.g. by chemical etching to remove a surface layer from the surface of the detector through which the $\alpha$-particles have penetrated it, so that only tracks remain of a desired depth in the detector, followed by electrochemical etching, to render said remaining tracks visible for counting.

For said 10 mm spacing between the filter and detector, a 200 $\mu$m thick polycarbonate foil has been found to be suitable for the detector. This can be chemically etched by a suitable etchant liquid such as a mixture of ethanol and water, e.g. in an EtOH:H$_2$O volume ratio of 1:4, in which KOH is dissolved to a concentration of 6N. The electrochemical etching may be carried out in an electrochemical etching cell in which the detector, while still in contact via its chemically etched surface with said etching solution, is exposed on its opposite surface to a suitable electrolyte solution such as an aqueous NaCl solution, a suitable potential, e.g. an alternating potential, being applied to the cell to cause the inner ends of the tracks to branch into small cracks so that said track ends become visible and can be counted. For said 200 $\mu$m foil an alternating potential of 800 V$_{rms}$ at 2 kHz has been found to be suitable.

The invention thus extends to a method of monitoring the degree of exposure to which a person is subjected by radiation from radon daughters, which method comprises the steps of passing air in the person's environment through a cyclone to separate non-respirable dust and aerosol particles from the air, passing the air issuing from said cyclone through a filter to filter respirable dust and aerosols from the air passing through the cyclone, and detecting radiation emitted by radon daughters attached to dust and aerosol particles filtered from the air by the filter.

The method may comprise mounting the cyclone, filter and detector on the person, so that said radiation is monitored in the immediately vicinity of the person, the method including the step of using a track-etch detector for detecting the radiation, and including the subsequent steps of etching the detector and counting tracks formed thereon.

According to another aspect of the invention there is provided an electrochemical etching cell which comprises at least one pair of open-ended cup-shaped liquid containers and clamping means for clamping the containers of each pair together with their open ends in opposed relationship with a flat track-etch detector to be etched clamped sealingly therebetween, each container having a filler opening for an etching liquid.

The clamping means may comprise an electronically insulating support for supporting each pair of said containers and, fast with the support, an abutment and, aligned with the abutment and spaced therefrom, a threaded socket with which a clamping screw is screwingly engaged, the screw being screwable towards the abutment to clamp each pair of said containers together and to clamp the containers in series against the abutment. The abutment may be a further clamping screw engaging a threaded socket, the sockets and screws being coaxially aligned and the screws being screwable towards each other to clamp the containers together in series.

Each cup-shaped container may have a floor from which a central pillar projects towards its open end, the pillar having a socket for receiving an electronically insulating plug in its free end for closing off a central opening in an annular detector to be etched. Each filler opening may be provided with a filler pipe; and the outer periphery of the open end of each container may have a circumferential rebate to reduce the likelihood of sparking from one container to another, the containers all conveniently being of electronically conductive material, e.g. steel.

Thus, in a particular construction, the clamping means may comprise an electronically insulating support for supporting each pair of said containers and, fast with the support, an abutment and, aligned with the abutment and spaced therefrom, a threaded socket with which a clamping screw is screwingly engaged, the screw being screwable towards the abutment to clamp each pair of said containers together and to clamp the containers in series against the abutment, each cup-shaped container having a floor from which a central pillar projects towards its open end, the pillar having a socket for receiving an electronically insulating plug in its free end for closing off a central opening in an annular track-etch detector clamped between a pair of said containers.

The invention will now be described, by way of example, with reference to the accompanying schematic drawings, in which.

Figure 1:
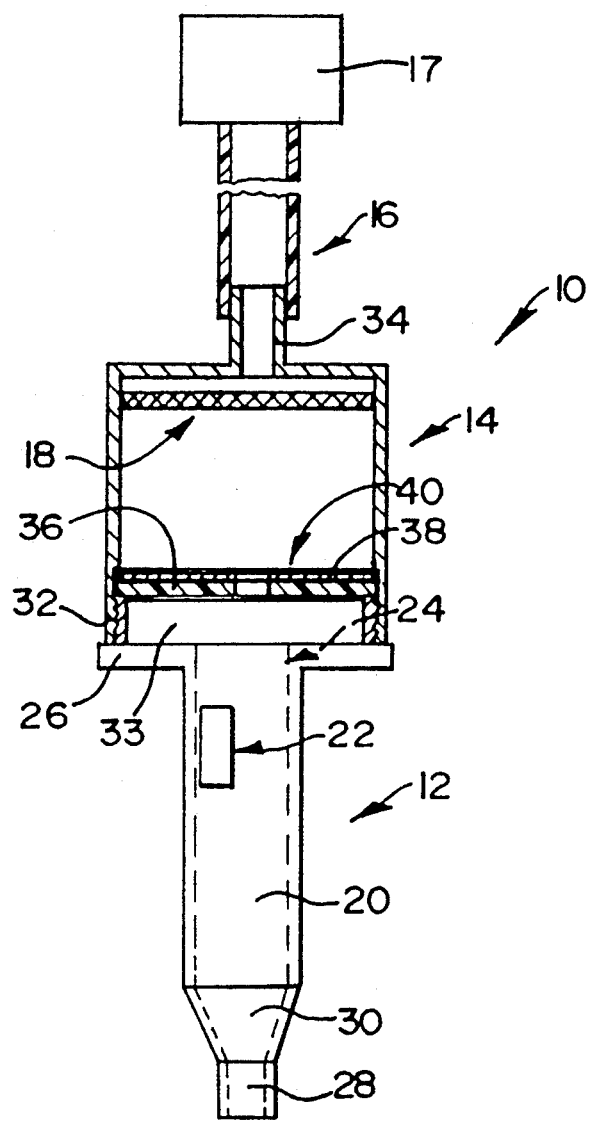
FIG. 1 shows a part-sectional side elevation of a radon daughter dosemeter according to the present invention.

In FIG. 1 of the drawings, reference numeral 10 generally designates a lightweight personal radon daughter dosemeter in accordance with the present invention. The dosemeter comprises a cyclone 12 and a filter holder 14, connected to an air suction tube 16. The tube 16 leads to a air suction pump shown schematically at 17 having a battery driven direct current motor and capable of drawing about 1,9 l/min air through the cyclone 12.

The cyclone 12 and holder 14 are of a type commercially available as a unit, for use in personal gravimetric dust samplers, the holder having a membrane filter 18 therein, also of the type used in such dust samplers.

The cyclone 12 has a circular cylindrical hollow body 20 provided with an air inlet in the form of a window 22, and an air outlet 24 at one end of the body 20. The end of the body 20 providing the outlet 24 has a circumferentially extending radially outwardly projecting flange 26. At the opposite end of the body 20 there is a solids outlet in the form of a tube 28 at the narrow end of an axially outwardly tapering portion 30 of the body 20.

Although the cyclone is shown in side elevation in FIG. 1, the holder 14 and tube 16 are shown in sectional side elevation for ease of illustration.

The holder 14 is cup-shaped and has an internally screw-threaded open end 32 which is releasably screwed on to an externally screw-threaded hollow spigot 33, which projects axially outwardly from the flange 26 and extends circumferentially along and spaced radially inwardly from and adjacent the outer periphery of said flange 26.

The holder 14 has a centrally positioned outlet in its floor which is provided by a spigot 34 projecting into an end of the tube 16. The filter 18 is a flat circular disc frictionally located in the holder 14, spaced from and adjacent the floor of the holder 14, frictionally engaging, via its outer periphery, the curved side wall of the holder.

A polycarbonate solid state nuclear $\alpha$-particle track detector 36, and an $\alpha$-particle radiation absorbing discriminator 38 are located in the holder 14. The detector 36 is of 'MAKROFOL DE' polycarbonate foil, 200 $\mu$m thick, available from Bayer AG. The discriminator or absorber 38 is of 'MYLAR' polycarbonate foil and is 36 $\mu$m thick. The detector 36 and absorber 38 are both flat annular discs, each having a central opening of 6 mm diameter, and an outer diameter of 25 mm. These are arranged in face-to-face abutment, with the detector 36 held in place against the outer or free end of the spigot 33 by the absorber 38, the absorber 38 in turn being held in place by a shoulder 40 on the inner surface of the curved side wall of the holder 14, the shoulder facing towards the cyclone 12.

The spacing between the filter 18 and detector 36 is 10 mm and the dosemeter 10 is shown roughly full-size in FIG. 1 and roughly drawn to scale.

In use, to obtain a measure of the potential $\alpha$-energy concentration of airborne radon daughters in a particular environment, the dosemeter 10 is carried upright as shown in FIG. 1 by a user, with its pump and battery, e.g. attached to the user's clothing, and is operated for a predetermined period, e.g. for an eight-hour shift underground in a mine.

Suction of air by the pump along the tube 16 draws air into the cyclone 12 via the window 22 and thence through the holder 14. Non-respirable dust particles are separated in the cyclone from the air and fall under gravity from the cyclone via its outlet tube 28. Respirable dust- and aerosol particles are carried by the air through the cyclone outlet 24 into the holder 14. In the holder the air and respirable particles pass through the central openings in the detector 36 and absorber 38 and travel to the filter 18 where the particles are filtered from the air which passes through the filter and via the spigot 34 into the tube 16. The particles remain on or in the filter 18.

At the end of the shift or similar monitoring period, and after allowing an appropriate time to pass for sufficient decay of short-lived radon daughters, the detector is removed from the holder and etched as described hereunder.

Figure 1A:
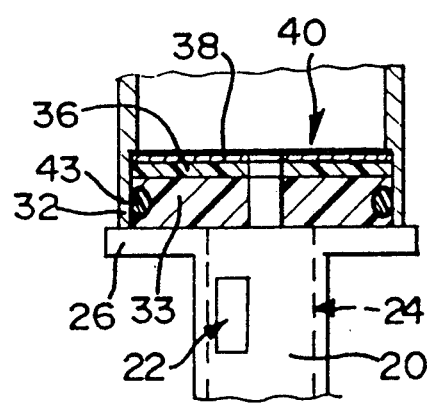
FIG. 1A shows a view similar to FIG. 1 of a portion of a variation of the construction of FIG. 1.

In the construction sown in FIG. 1A, in which the same reference numerals are used to designate the same parts as in FIG. 1, unless otherwise specified, the chief differences between the construction of FIG. 1A and that of FIG. 1 are that there is no screw threaded connection between the holder 14 and spigot 33. Instead, the spigot 33, which is solid except for a central passage which registers with the central openings of the discs of the detector 36 and absorber 38, has an annular circumferential groove in its outer curved surface, in which is seated an O-ring 43 which seals the spigot 33 frictionally to the inner curved surface of the open end of the holder 14.

Figure 2:
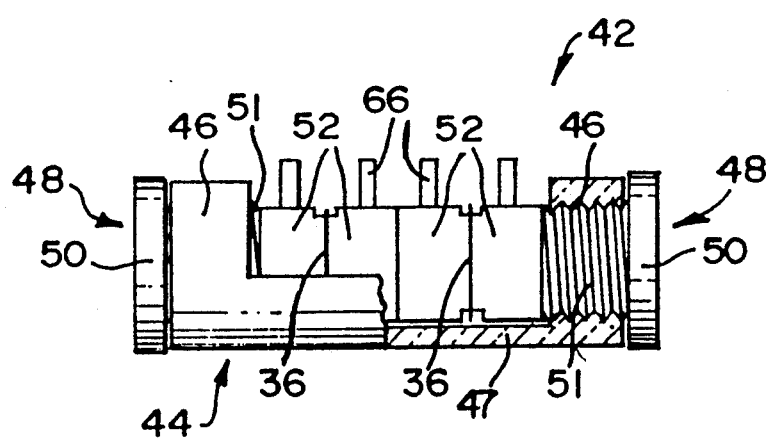
FIG. 2 shows a part-sectional side elevation of an electrochemical etching cell according to the invention.

Referring to FIG. 2, an electrochemical etching cell according to the invention is generally designated 42. The cell comprises a clamping means 44 of 'PERSPEX' plastics insulating material. The clamping means 44 is of hollow cylindrical shape and has opposite ends which are internally screw-threaded, to form sockets 46 in which are located respectively two clamping screws 48, each having a head 50 and a threaded shank 51. The clamping means 44 has a semi-cylindrical cut-out removed therefrom, between the sockets 46, to provide a semi-cylindrical support 47 for supporting two pairs of containers 52, described in more detail hereunder with reference to FIGS. 3 and 4.

Figure 3:
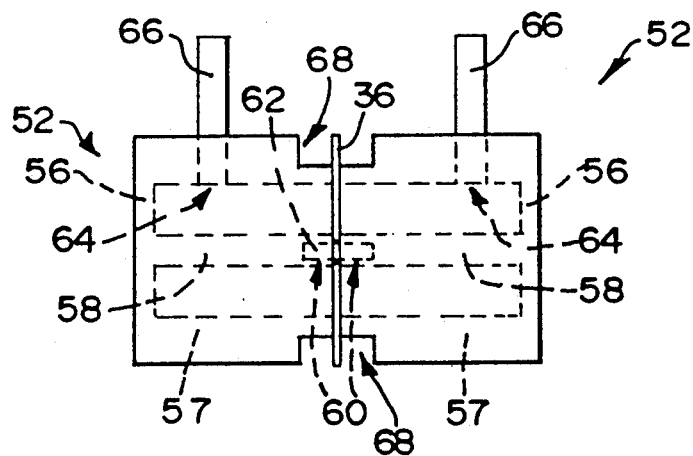
FIG. 3 shows a side elevation of a pair of containers forming part of the cell of FIG. 2.
Figure 4:
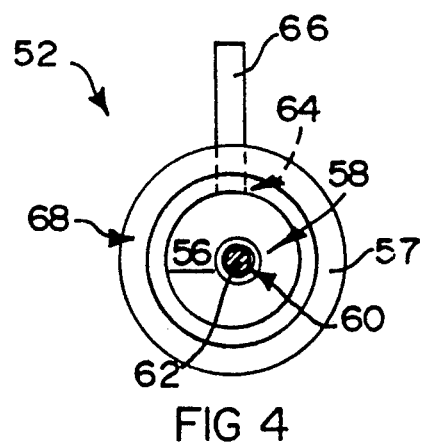
FIG. 4 shows an end elevation of one of the containers of FIG. 3.

In FIGS. 3 and 4 the containers are generally designated 52, each being cup-shaped and of circular cylindrical outline. Each container 52 has a circular floor 56 and a cylindrical side wall 57. Each container 52 has a pillar 58 projecting centrally from its floor 56 along its interior towards its open end, the pillar 58 and side wall 57 having the same axial length. The free end of each pillar 58 has a cylindrical axially outwardly opening socket 60 therein.

The containers are arranged in pairs (FIG. 3) with their open ends in opposed relationship, with a detector 36 (see also FIG. 1) clamped concentrically therebetween, the central opening of the detector registering with the mouths of the sockets 60. A flexible electronically insulating plastics or elastomeric cylindrical plug 62 is located with a liquid-tight sealing frictional fit in said sockets 60, passing sealingly through the central opening of the detector 36. Each container 52 has a filler opening 64 provided with a filler pipe 66. The outer periphery of the rim of the open end of each container 52 is provided with a circumferential rebate 68.

As is apparent from FIG. 2, two pairs of containers 52 (one pair of which is shown in FIG. 3) are clamped in series in the clamping means 44 by the screws 48, the containers resting in the support 47, with the support 47 extending horizontally and the filler pipes 66 projecting vertically upwardly.

When the detector 36 is in the holder 14 (FIG. 1) in use, α-particles, emitted from the radon daughters $^{218}$Po and $^{214}$Po attached to respirable dust- or aerosol particles on the filter 18 and which have been filtered from air passing through the dosemeter 10, penetrate the detector 36 and cause tracks therein. The absorber 38 absorbs 6MeV α-particles emitted from said radon daughters and permits only 7,8 MeV α-particles emitted therefrom to penetrate the detector 36 and cause said tracks.

In use of the cell 42 of FIG. 2, two detectors 36 are located between their respective pairs of containers 52 as described above, and a chemical ethanol liquid comprising ethanol and water in an EtOH:H$_2$O volume ratio of 1:4 is charged into one of the containers 52 of each pair via its pipe 66, namely that container 52 which is faced by the surface of the detector 36 which faced towards the filter 18 in the dosemeter 10 and was penetrated by the 7,8 MeV α-particles. The ethanol/water etchant liquid is left in contact with the detector 36 for 30 minutes, to etch chemically and remove a thin layer from said surface of the detector 36, to leave only tracks which have penetrated deeper than the thickness of said layer into the detector 36.

An aqueous sodium chloride solution is charged into the other container 52 of each pair, via its pipe 66, no later than when the 30 minute chemical etching period ends. Electrochemical etching of the detector 36 is started at the end of the chemical etching period.

Electrochemical etching is by applying an 800 V$_{rms}$ alternating potential across the detector 36 at a frequency of 2 kHz, using the containers 52 of the pair, which are of steel, as electrode terminals connected to an external circuit (not shown). This electrochemical etching, which is continued for 90 minutes, creates electric fields at the inner ends of the remaining α-particle tracks in the detector 36, which fields break down the polycarbonate there, to form a plurality of branching tree-like cracks at the inner end of each track. The cracks form, at the end of the electrochemical etching, spots of 50–70 μm diameter, visible to the naked eye. These spots can be counted, e.g. using a microfiche reader or an automatic track counting system, to determine the surface density (tracks/area) on the detector 36.

The Applicant has found that, operated as described above, the dosemeter 10 and cell 42 can provide easily countable track surface densities without any unacceptable track overlapping. After calibrating the dosemeter by operating it for various time periods in air having known constant levels of $^{218}$Po, $^{214}$PB and $^{214}$Po, followed by etching as described above to determine track surface densities, the dosemeter and cell could be used to obtain track densities from air, from which potential α-energy concentration in the air can be calculated, with an error of at most 30%, regardless of the $^{218}$Po:$^{214}$Pb:$^{214}$Po ratio in the air. This margin of error is considered to be acceptable for a lightweight portable personal radon daughter dosemeter.

Figure 5:
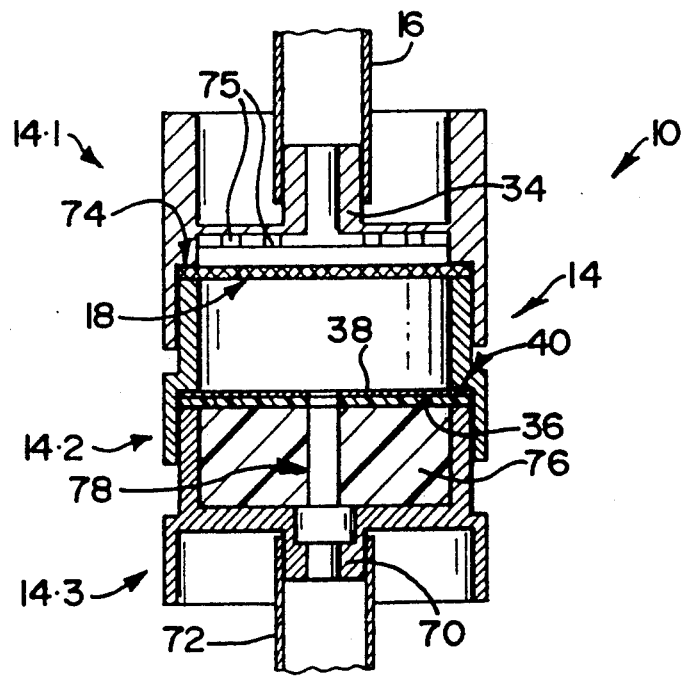
FIG. 5 shows a view, similar to FIG. 1, of part of a another variation of the dosemeter of FIG. 1.

FIG. 5 shows a variation of FIG. 1, and unless otherwise specified, the same reference numerals refer to the same parts. In FIG. 5, for ease of illustration, the cyclone 12 is omitted.

In FIG. 5, the filter holder 14 is made up of three portions, namely an outlet portion 14.1 which is cup-shaped and has the tube 16 connected to its spigot 34, a cylindrical central portion 14.2 and an inlet portion 14.3, broadly similar to the outlet portion 14.1, and having a spigot 70 connected to a pipe 72 leading to the cyclone. A cylindrical plastics spacer 76 is located in the inlet portion of the holder 14 to occupy its volume, the spacer 76 having a central passage 78, similar to the central passage of the spigot 33 of FIG. 1A, which similarly registers with the central openings of the detector 36 and absorber 38.

The central portion 14.2 fits frictionally spigot/socket fashion into the outlet portion 14.1, the rim of the central portion which is received in the outlet portion 14.1 holding the filter 18 up against a shoulder 74 adjacent the floor of the cup of the outlet portion 14.1. Similarly, the inlet portion 14.3 fits spigot/socket fashion into the central portion 14.2 and the rim of the inlet portion 14.3, which is received with a friction fit in the central portion 14.2, holds the detector 36 and absorber 38 against the shoulder 40, which in this case is provided on the central portion 14.2, the cup of the inlet portion functioning in a fashion similar to that of the spigot 32 of FIG. 1.

The floor of the cup of the outlet portion 14.1 is provided with a plurality of air flow channels 75 therein, namely a plurality of radial channels, equally circumferentially spaced, radiating from the interior of the spigot 34, and a plurality of circumferentially extending radially spaced concentric channels, intersected by the radial channels and communicating therewith, to allow air flow from the filter 18, into the spigot 34, even if air pressure urges the filter 18 flat against said floor.

The Applicant has found that cyclones of the type used for personal gravimetric dust samplers, modified if necessary, are suitable for use in the present invention. Such samplers are provided with suitable filters for filtering respirable dust or aerosols from air, and are typically of lightweight construction, being connected via their air outlets to lightweight battery- or electrochemical cell-driven air pumps for suction of air therethrough.

It is an advantage of the invention as illustrated that it provides an inexpensive, easily operable personal radon daughter dosemeter. It is contemplated that, e.g. in a mine where α-particle radiation from radon daughters can cause danger, each or at least some of the miners will carry a dosemeter 10 according to the invention when underground. Conveniently at the end of a shift, and after at least 4 hours the detectors 36 will be collected and will be etched at a central work station, where track counts will be made to determine the potential α-energy concentration to which each miner has been exposed. It is a particular advantage of the invention that the dosemeter 10 uses known, standardized, massproduced personal gravimetric dust sampler components, together with detectors 36 and absorbers 38 which are easy and inexpensive to make and instal.

We claim:

1. A radon daughter dosemeter which comprises:

a cyclone having an air inlet, a solids outlet and an air outlet, for separating non-respirable dust and aerosol particles from air;

a filter mounted on the cyclone for filtering respirable dust and aerosol particles from air passing through the cyclone from the air inlet to the air outlet; and a detector mounted on the cyclone for detecting radiation emitted by radon daughters attached to dust and aerosol particles on the filter.

2. A dosemeter as claimed in claim 1, which is of portable construction, and comprises a portable electrochemical cell-driven air suction pump connected to the air outlet of the cyclone, for suction of air through the cyclone.

3. A dosemeter as claimed in claim 1, in which the detector is a solid state nuclear track-etch detector for detecting α-particle radiation.

4. A dosemeter as claimed in claim 3, in which the detector comprises a plastics material capable of being penetrated by α-particles having sufficient kinetic energy, to leave tracks, which detector can be etched to render the tracks detectable and countable.

5. A dosemeter as claimed in claim 3, in which the filter and detector are flat and planar in shape, spaced from each other in parallel opposed relationship.

6. A dosemeter as claimed in claim 3, in which the air outlet of the cyclone has a hollow circular-cylindrical filter holder releasably attached thereto, the filter being a circular disc and being located as a partition in the filter holder between an inlet to the filter holder which communicates with the cyclone air outlet, and an air outlet from the filter holder.

7. A dosemeter as claimed in claim 6, in which the detector is circular in outline, being located as a partition in the holder, upstream with regard to air flow, from the filter, the detector having an air flow opening therethrough.

8. A dosemeter as claimed in claim 7, in which a radiation-absorbing discriminator is located between the filter and detector, for reducing the number of tracks detected by the detector.

9. A method of monitoring the degree of exposure to which a person is subjected by radiation from radon daughters, which method comprises the steps of passing air in the person's environment through a cyclone to separate nonrespirable dust and aerosol particles from the air, passing the air issuing from said cyclone through a filter to filter respirable dust and aerosols from the air passing through the cyclone, and detecting radiation emitted by radon daughters attached to dust and aerosol particles filtered from the air by the filter.

10. A method as claimed in claim 9, which comprises mounting the cyclone, filter and detector on the person, so that said radiation is monitored in the immediately vicinity of the person, the method including the step of using a track-etch detector for detecting the radiation, and including the subsequent steps of etching the detector and counting tracks formed thereon.

* * * * *

UNITED STATES PATENT AND TRADEMARK OFFICE
CERTIFICATE OF CORRECTION

PATENT NO. : 5,223,439
DATED : June 29, 1993
INVENTOR(S) : Rainer Rolle et al.

It is certified that error appears in the above-identified patent and that said Letters Patent is hereby corrected as shown below:

On title page, item [54] Inventor:
    following the word "Africa" please insert the following:

--; Rian Strydom, Ifafi, South Africa; Andries H. Leuschner, Pretoria, South Africa--

Signed and Sealed this

Third Day of May, 1994

Attest:

BRUCE LEHMAN

Attesting Officer      Commissioner of Patents and Trademarks